July 7, 1953          H. T. JENSEN          2,644,534

AUTOMATIC TORQUE COMPENSATOR

Filed Oct. 5, 1946          5 Sheets-Sheet 1

H. T. JENSEN
INVENTOR

BY Charles L. Shelton

ATTORNEY

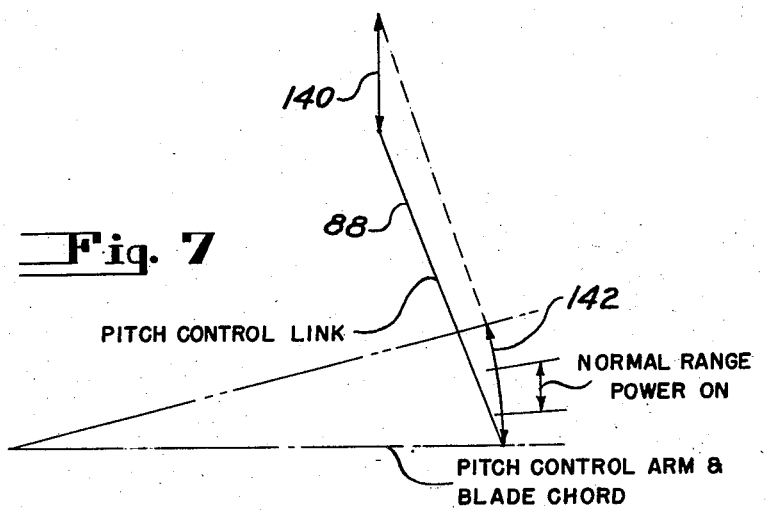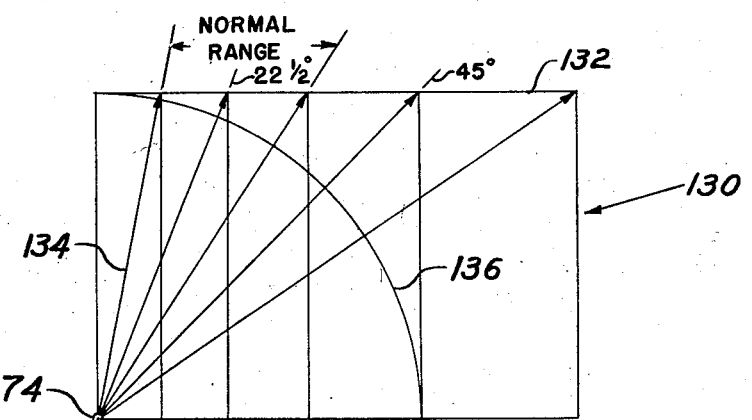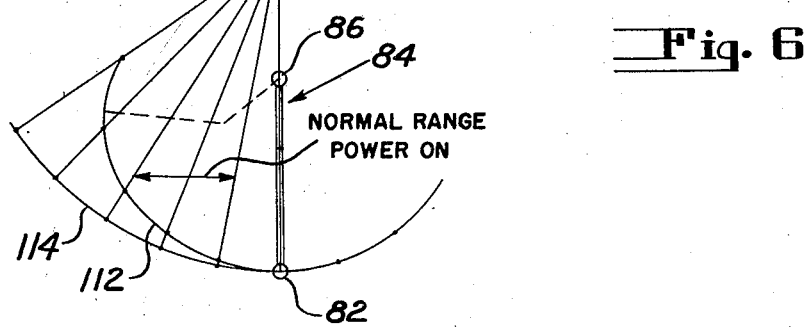

July 7, 1953

H. T. JENSEN 2,644,534

AUTOMATIC TORQUE COMPENSATOR

Filed Oct. 5, 1946

H. T. JENSEN
INVENTOR

BY Charles F. Shelton

ATTORNEY

Patented July 7, 1953

2,644,534

UNITED STATES PATENT OFFICE 2,644,534

AUTOMATIC TORQUE COMPENSATOR

Harry T. Jensen, Milford, Conn., assignor to United Aircraft Corporation, East Hartford, Conn., a corporation of Delaware Application October 5, 1946, Serial No. 701,605

4 Claims. (Cl. 170—135.22)

This invention relates generally to rotary wing aircraft; more particularly to craft of the helicopter type; and more specifically to improved structure for compensating the torque of rotors of helicopters, to improved automatically operated structure for controlling the thrust of torque compensating rotors, and to improved means for obtaining and maintaining pitch trim in helicopters.

In presently known helicopters of the type employing an auxiliary rotor aft of the main rotor for compensating the torque of the latter, the pilot must attend constantly to the counterbalance of main rotor torque by adjusting the thrust of the torque compensating rotor, sometimes called the tail rotor. Such action on the part of the pilot may be done only by neglecting other controls at times, and may not be done accurately at all by an unskilled pilot thereby causing erratic operation of the helicopter and waste of fuel.

Heretofore, proposals have been made to provide gyroscopes, or the like, to maintain a given heading for a craft by actuation of a torque compensating rotor. Such devices, while probably satisfactory to a degree in forward flight, are nevertheless subject to a time delay action, or lag, because of the fact that an undesirable heading must be attained before any corrective force whatever is brought into play. When brought into play, the condition is usually worsening so that an excess of force must be used to overcome the condition and to return the helicopter to the desired heading, which action may cause hunting, and is quite likely to waste fuel.

Hence, an object of this invention is to provide improved automatic means for counteracting the torque of the sustaining rotor as substantially an instantaneous action or function responsive to torque of the sustaining rotor.

Another object is to provide an improved torque compensating device for helicopters, or the like.

A feature is to provide improved structure for obtaining automatic torque compensation while retaining a predetermined component of lift in the structure.

Still further objects and features reside in the mechanical, electrical, and hydraulic details of construction and combinations of parts and will be either obvious or pointed out in the following specification and claims.

In the drawings,

Fig. 6 is a chart of component compensation requirements;

Fig. 7 is a chart of the blade pitch change to effect component compensation;

Figure 1:
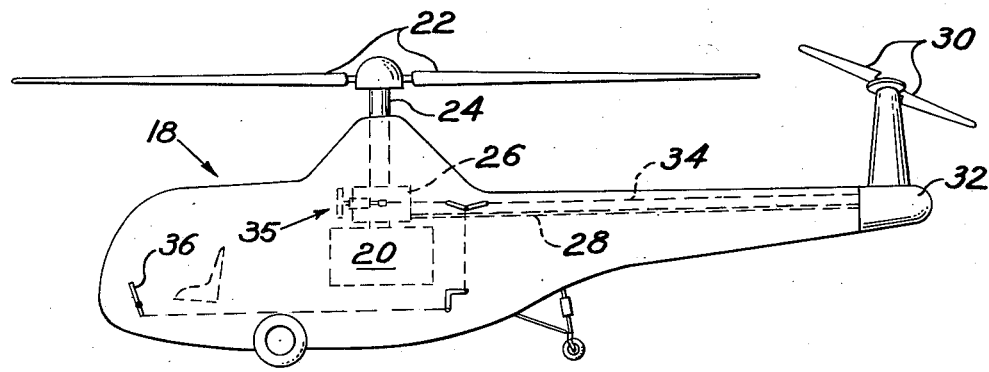
Fig. 1 is a side elevational view of a helicopter including my invention and showing parts thereof diagrammatically.

Referring more in detail to the drawings, and first to Fig. 1, a helicopter body 18 supports a suitable engine 20 for turning sustaining rotor blades 22 through a shaft 24. A reduction gear 26, which may be of the planetary gear type, is connected between the engine 20 and the shaft 24. A torque compensating rotor drive shaft 28 may also be driven by the engine 20 or through the reduction gearing 26 as best suits the installation, and the shaft 28 turns torque compensating rotor blades 30 shown as mounted upon a rotatable empennage or tail piece 32 carried at the rearmost extremity of the body 18. In the modification illustrated in Fig. 1, the rotor blades 30 of the torque compensating rotor are rotated in and out of the plane of the paper by a control rod 34 which rotates the tail piece 32. The control means for rotating the compensating rotor 30 comprises an automatic control device 35 responsive to torque of the sustaining rotor blades 22 through the gear box 26, which automatic control 35 works in conjunction with and may be over-ridden by manual control pedals or stick 36, or the like.

Figure 2:
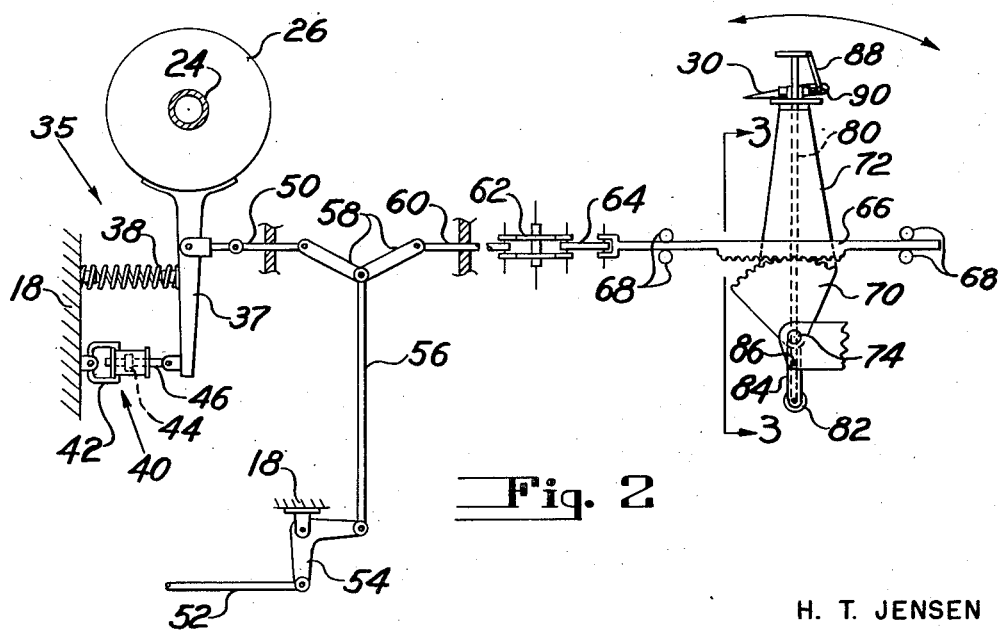
Fig. 2 is a diagrammatic view of one form of the invention.

In Fig. 2, the automatic control device 35 is shown diagrammatically, but in more detail. The gear box 26 may be mounted upon the drive shaft 24 on bearings so that it can rotate relative to either the input or output ends of the drive shaft. Thus, as power is supplied from the engine 20 through the gear box 26 to the drive shaft 24 and thence to the rotor blades 22, there will be a counter-torque force tending to cause rotation of the gear box 26 if it were not secured. In this invention, I prefer to connect the gear box 26 to the helicopter body 18 by an arm 37 and a resilient connection shown as a spring 38. To prevent vibration and hunting action of the control device 35, a dash pot 40 is pivotally mounted by a yoke 42 to the body 18 and contains a piston 44 connected by a rod 46 to the arm 37. With such construction, as the torque to the drive shaft 24 changes, the gear box 26 will tend to rotate in one direction or the other to change the tension of the spring 38. Such movement will cause movement to the right or left, as the case may be, of a push pull rod 50, which motion will cause tilting of the compensating rotor 30 in a manner to be described more fully hereinafter.

The manual control portion of this automatic torque compensating mechanism is operated from the control stick 36 (Fig. 1) which moves a push pull rod 52 to rock a bell crank 54 having its mid-pivot connected with the body 18 of the helicopter. Fore and aft movement of the push pull rod 52 will cause rotation of the bell crank 54, and vertical movement of a push pull rod 56 connected with the mid-pivot of toggle arms 58 which upon being moved at their mid point will move a rod 60 towards or away from the rod 50. Movement of the rod 60 under the influence of the automatic control means 35 in response to main rotor torque or in response to movement of the control stick 36 will cause movement of the torque compensating rotor blades 30 in a manner now to be described.

Figure 3:
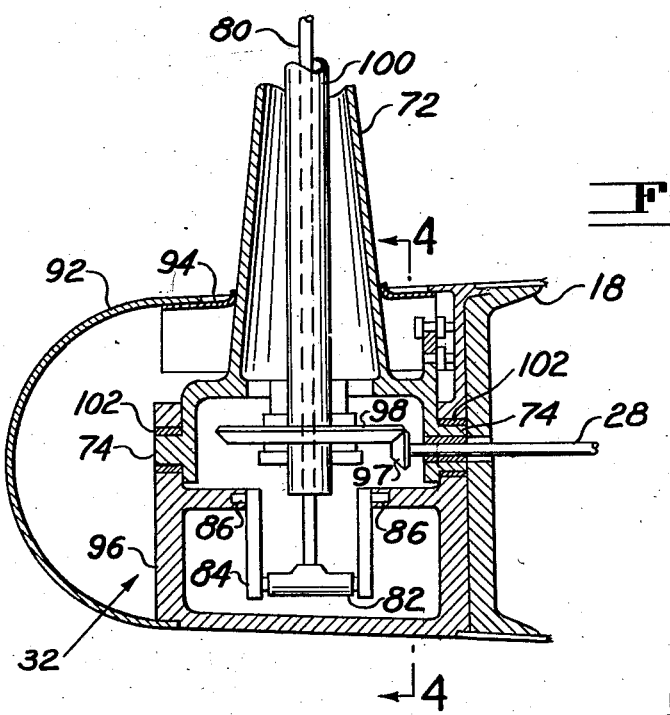
Fig. 3 is taken on line 3—3 of Fig. 2 and is a longitudinal half sectional view of the auxiliary rotor of my invention with a mechanical thrust component compensator.

The rod 60 connects with a bell crank 62 which changes direction of motion for the rod 60 to right angles with a rod 64. That is, the push pull direction of rod 60, which is fore and aft in the helicopter, is changed 90° by bell crank 62 so that rod 64 reciprocates in a direction transverse to the fore and aft axis of the helicopter. This is necessary with rod connections because the torque compensating rotor 30 moves around in a plane at an angle to the direction of motion of the rods 50 and 60. Movement of the rod 64 will move a rack 66, confined in guide rolls 68, back and forth. The rack 66 engages a toothed segment 70 that is connected with a torque compensating rotor cone 72 so that both the cone and the segment rotate about a pivot 74 (Fig. 3). Hence, movement of the rod 60 will cause movement to the right or left in an arcuate path of the rotor blades 30 so that the lateral component of thrust of the rotor blades can be altered to accommodate the variable requirements of torque of the main rotor blades 22. As pointed out above, this motion can be obtained either by motion of the gear box 26 which moves the rods 50 and 60 together as the rod 56 pivots around its point of connection with the bell crank 54; or can be obtained by movement of the rod 52 by the manual control stick 36 which lengthens or shortens the toggle 58 with respect to the points of connection of the rods 50 and 60 with the automatic control device 35. Accordingly, it is seen that the automatic control device 35 uses the position of the manual control means 36 as a reference in performing its control function, and the manual means 36 also makes use of the position of the automatic control means 35 as a reference in performing its control function. Hence, the manual means 36 may be used to trim the craft at all times, and the automatic control device 35 will superpose its function upon the function of the manual means 36 so that the pilot will be relieved of a large percentage of the duty of attending to the torque compensation function of the tail rotor blades 30 and may give his attention to trimming the craft for heading and for variations in load. For steady flight the control stick 36 may be locked in position and the control means 35 will adjust automatically for torque changes during flight.

Figure 4:
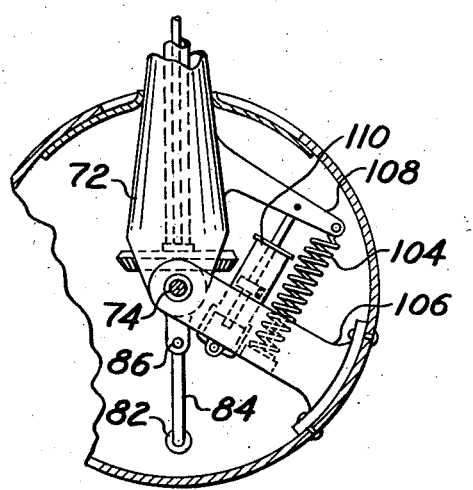
Fig. 4 is a partial sectional view taken on the line 4—4 of Fig. 3.

Referring again to Fig. 2 and also to Figs. 3 and 4, the pitch of the blades 30 is controlled through a push pull rod 80 connected by a pivot 82 at its lowermost end to a crank 84. The rod 80 is journalled for sliding motion within the cone 72 and hence rotates with the cone. The crank 84 is pivoted upon pins 86 at points out of registry with a line containing the pivots 74 for the arcuate segment 70 and the tail cone 72. Thus, as the tail cone 72 is rotated about the pivot 74, the push pull rod 80 will be reciprocated within the cone in a manner to be described more fully below. Reciprocation of the rod 80 causes movement up and down of a link 88 (Fig. 2) mounted at the uppermost extremity of the rod 80 and connected by a pivot 90 to the blade 30. The blade 30 is mounted upon a pivot at its hub so that its pitch can be changed. This structure is conventional in variable pitch propellers and rotor blades and hence has not been disclosed in detail. Accordingly, motion of the rod 80 will cause change in pitch and hence change in thrust for a given rotational speed of the rotor blades 30.

While many of the details of construction of the tail rotor mechanism may differ in design and arrangement from that of this disclosure, those details will be described to facilitate the reproduction and practice of my invention. Referring to Figs. 3 and 4, the rotatable tail piece 32 includes a streamline fairing 92 and has a seal-off skirt 94 slidable within the fairing and connected to the cone 72. A base member 96 may be secured to the helicopter body 18 and support all of this structure. The drive shaft 28 turns a bevel pinion 97 which rotates a bevel gear 98 splined to a tail rotor drive shaft 100 which may be suitably connected to a hub, not shown, for the tail rotor blades 30. The cone 72 may be mounted in bearings 102 to facilitate rotation thereof. Movement of the cone 72 may be opposed by a centering spring 104 that connects between a fixed bracket 106 and an arm 108 secured to the cone 72. A damper 110 which may be similar to the damper 40 (Fig. 2) may also be supplied to prevent hunting and vibration of the cone 72 and the rotor blades 30 connected therewith. The pinion 97 may rotate in a direction with respect to the torque requirement of this device so that the spring 104 may act at a predetermined spring rate to permit tilting of the cone 72 in a direction to compensate for torque of the main rotor. Also, this direction of rotation may be such that the torque requirements of the tail rotor in part compensate the torque requirements of the main rotor; for example, the two rotors may rotate in opposite directions but at different speeds.

Figure 5:
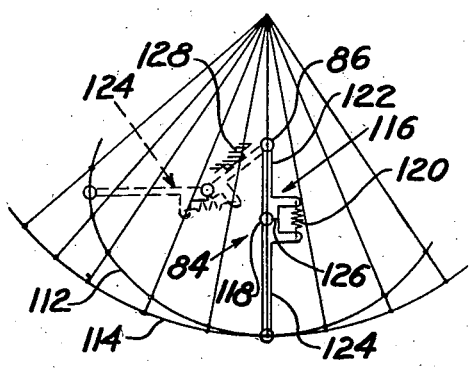
Fig. 5 is a diagrammatic view of a modified component compensating linkage superposed on a chart showing the operation thereof.

Referring now to Fig. 5, a linkage is shown for causing the shaft 80 to move upwardly with respect to the cone 72 and follow substantially a path 112 with respect to a path 114. The path 114 may be the path of an imaginary point connected with the cone 72, and the path 112 is the path of the pivot 82 of the crank 84. The crank 84 may contain a knee joint 116 including a pivot 118 and a spring 120 biasing arms 122 and 124 of the crank 86 into engagement with stop shoulders 126. A stop 128 may be engaged by the arm 122 after a predetermined rotation in a clockwise direction of the crank 86 so that the knee joint 116 will yield as shown in dotted lines at the left of the figure.

Referring now to Fig. 6, that portion of the operation of the device diagrammatically shown in Fig. 5 is repeated at the lower left hand side, and torque requirements to maintain a substantially constant lift are shown diagrammatically at 130. It will be understood that while the chart is drafted upon linear coordinates, that the non-linear requirements of change of lift for a change in incidence of an airfoil should also be included in the calculation of requirements, and mechanical advantages of the several linkages should also be compensated with the spring tension available in the springs 38, and 104, Figs. 2 and 4, or other springs and dampers as used to obtain a correct result including friction losses and the like; and that the disclosure is illustrative only and not restrictive. Accordingly, the chart 130 merely shows the function of the crank 86 to maintain substantially a constant lift represented by a line 132 by changing incidence of the blades 30. The motion of the lower end of the rod 80 represented by a radially extending line 134 is on a two-to-one mechanical advantage basis with respect to the line 132. In other words, the lower points move one-half the distance of the upper points in the chart of Fig. 6, and such motion can be obtained by mechanical linkages as required. The lines 112 and 114 have been repeated in Fig. 6 and represent the change required at 112 with respect to a given reference line 114 which would trace a point of rotation around the pivot point 74 for the cone 72. The crank 84 rotates around pivots 86 by action of the rod 80 to obtain the path of travel 112 of pivot 82 to cause the pitch of the blades 30 to follow the line 132 rather than a line 136 which is used as a base to indicate pitch change action without the pitch compensating crank 84.

Fig. 7 diagrammatically represents the normal range of pitch change for power on conditions at the tail rotor and the motion of the uppermost end of the pitch control rod 80 at 140. Motion as at 140 will cause a path of travel 142 for the point of connection of the link 88 with the blades 30. The point 142 will travel an arcuate path whereas the point 140 will travel a linear path and hence a correction may be required in design of the pivot point 86 for the crank 80 to compensate for the abberation between linear motion and rotative motion. Of course it is understood that the path 140 can be arranged with respect to the path 142 so that this error is of very low order and probably negligible.

Figure 8:
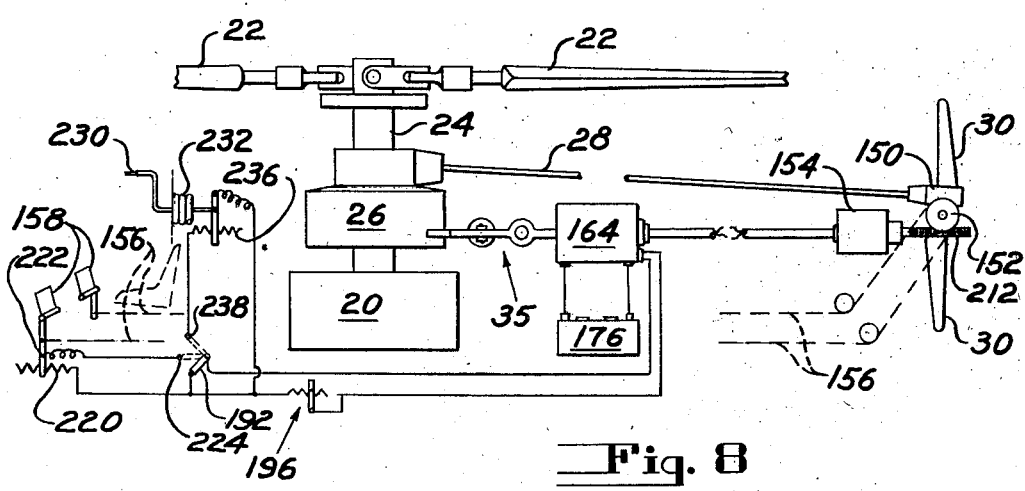
Fig. 8 is a diagrammatic view of an electrical automatic torque compensation control system.
Figure 9:
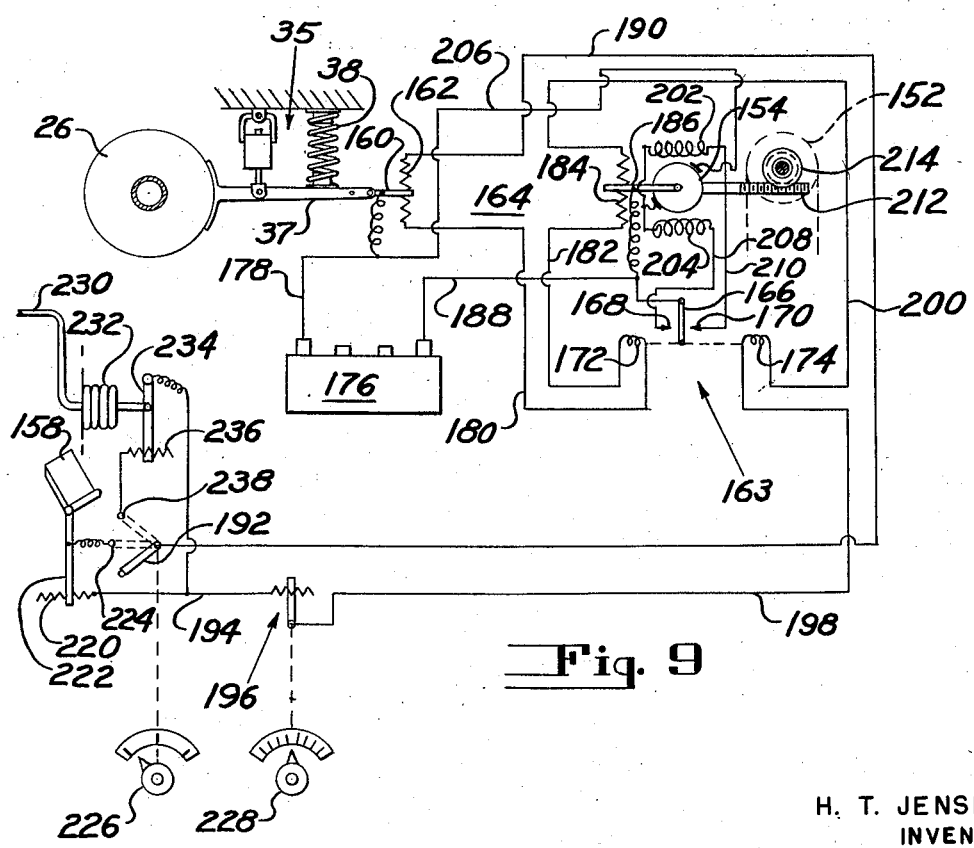
Fig. 9 is a wiring diagram of the structure shown in Fig. 8.

Figs. 8 and 9 show an electrical device for performing substantially the same function as the mechanical device described above as regards automatic torque compensation of the main sustaining rotor by the action in response to main rotor torque of an automatic control mechanism acting upon the tail rotor. Referring first to Fig. 8, the engine 20 rotates the blades 22 through the drive shaft 24 and gearing contained in the housing 26. The tail rotor drive shaft 23 turns the tail rotor blades 30 through suitable gearing 150. The pitch of the blades 30 is changed by means of a worm and pulley 152 substantially in the same manner as shown in Pat. #2,529,635, issued November 14, 1950, in Fig. 4, which shows a double worm device for changing the pitch of the sustaining rotor blades thereof. The same structure 152 may be used herein to respond either to a motor 154 operated in response to the torque of the main rotor in a manner to be described below, or operated through control cables 156 positioned by pedals 158 in the pilot's compartment of the helicopter. Movement of the pedals 158 will move the cables 156 differentially to rotate the pitch changing mechanism 152 to change the pitch of the blades and hence the thrust of the blades for a given speed of rotation thereof. The automatic control mechanism 35 may include a spring and damper of structure identical to that disclosed in Fig. 2. The arm 37 may carry a potentiometer wiper 160 which moves over a potentiometer 162 to change the balance in a bridge circuit 164 in a manner now to be described.

The potentiometer 162 controls the action of a double relay 163 to move a contact arm 166 into engagement selectively with contacts 168 and 170. Relay coils 172 and 174 may be selectively energized by separate legs of the bridge circuit. A battery or generator 176 or the like supplies current to the relay coils 172 and 174 through the following circuits. Energy for the coil 172 may come from the battery 176 through a wire 178, the wiper 160, the lower half of potentiometer 162, wire 180, the coil 172, wire 182, the lower half of a potentiometer 184, a wiper 186 positioned by the motor 154 and wire 188 back to the other side of the battery 176. Current for the relay coil 174 is supplied from the battery 176 through the wire 178, wiper 160, the upper part of the potentiometer 162, wire 190, a three-way switch 192, wire 194, a trim adjusting potentiometer 196, wire 198, coil 174, wire 200, the upper portion of potentiometer 184, motor driven wiper 186, and wire 188 back to the battery 176. Energization of either of the coils 172 and 174 will cause movement of the relay contacts 166 into engagement with either the contact 168 or 170. If desired, the relay contact 166 may be suitably damped and magnetically or spring centered to have a neutral position as shown to prevent constant action in one direction or the other of the control device. However, such constant action may be desirable in some craft and the centering mechanism may be eliminated to increase the sensitivity of the automatic control system. The contacts 168 and 170 selectively control energization of field windings 202 and 204 for the motor 154. Energy for these windings is fed from the battery 176 through the wire 178 to a common wire 206 through the motor armature to either of the coils 202 or 204; through a wire 208 to the contact 168 through the contact arm 166 and a common wire 188 back to the battery 176; and through wires 210 to contact 170, contact arm 166 and the common wire 188 back to the battery 176. When the field winding 202 is energized, the motor 154 will rotate in a first direction to turn a worm 212 and thus a gear 214 to change the pitch of the blades 30. When the coil 204 is energized, the worm 212 will rotate in the opposite direction to change the pitch of the blades 30 in the opposite sense.

When more torque is required by the sustaining rotor blades 22, and they are turned clockwise, the gear box 26 will be biased in a direction to rotate the same counter-clockwise and compress the spring 38. This will cause the wiper 160 to move upwardly on the potentiometer 162. At this time, current from the battery 176 through the wires 178 and the wiper 160 will have less resistance through the wires 190, the switch 192, the wire 194, a trim adjustment 196, the relay coil 174, the wire 200, the upper part of potentiometer 184, the motor wiper 186 and the wire 188 back to the battery than it will have through that circuit which energizes the coil 172 and which was traced above. Accordingly, the contact arm of the relay 164 will be drawn into engagement with the contact 170 which will energize the field winding 202 of the motor 154 to rotate the control mechanism 152 in a direction to change the pitch of the blades 30 of the tail rotor in a direction to counterbalance such torque so that the body of the helicopter will not be rotated in a direction opposite to the direction of rotation of the main sustaining rotor blades 22. Movement of the motor 154 will cause the potentiometer wiper 186 to move downward in a direction to increase the resistance in the above named circuit to the relay coil 174 and to decrease the resistance in the circuit to the relay coil 172 till such time that the energization of each is substantially equal, at which time the relay contact 166 will move into the mid-position shown if a centering device is used therewith, or into engagement with the contact 168. It is to be understood that if desired, known anticipating circuits can be employed in connection with the bridge circuit described above to prevent overshooting or hunting of the control arrangement described above. Upon a decrease in torque requirements in the main rotor the potentiometer wiper 160 moves downwardly to energize the relay coil 172 so that the motor 154 is operated to change the pitch in the opposite sense than described immediately above to balance the requirements of the system to prevent rotation of the body of the helicopter in the direction of rotation of the main rotor blades 22.

It is possible in the electrical control system to use the automatic portion thereof as a power booster for the manual control system. In other words, the pedals 158 can move the cables 156 to change pitch of the blades 30 at all times, but by also employing a potentiometer 220 with a wiper 222 connected to at least one of the pedals 158, the control system described above can be operated in a manner to unbalance the bridge under the influence of manual control so that the motor 152 can aid the pilot in his manual operation to prevent fatigue or to reduce the manual force required to operate the controls of a large helicopter. To obtain such aided manual control, the switch 192 may be moved into engagement with a contact 224. At this time the current to the coil 174 will be variable upon he operation of the pedal 158, and the coil 172 of the bridge circuit will act as a reference. Hence, the pilot may move the pedal 158 to include more or less than a given resistance to raise or lower the potential of the coil 174 with respect to the now reference coil 172 to cause the motor 152 to operate in one direction or the other. The switch 192 may be conveniently operated by a knob 226 located within reach of the pilot. Also, the trim adjustment potentiometer 196 may be operated by a knob 228 similarly located.

It is also possible with the electrical system to obtain automatic speed compensation. It is well known that when hovering, a helicopter requires substantially the maximum of power of the tail rotor to maintain a given heading, plus enough reserve power for control purposes. However, when the helicopter is in forward flight, up to a certain point there is a weathercock action of the empennage section and it is conventional practice to design such sections to obtain the best efficiency in forward flight when flying in a somewhat crabwise manner so that a maximum amount of torque is available to the sustaining and propelling rotors and only a minimum of torque is required in the torque compensating and controlling tail rotor. In order to obtain the maximum in efficiency in a helicopter of this type, I propose to introduce means responsive to speed of the helicopter, at least in the forward sense, for compensating the action of the automatic torque compensating built in structure described above, to provide for automatic reduction in torque requirement during forward speed. A Pitot head 230 may lead to a suitable statically balanced bellows or diaphragm or the like 232 which may position a potentiometer 234 shown by way of example. It is to be understood that capacitance or inductance types of sensitive elements could also be used, and that they may require less operating force, or that suitably boosted electronic circuits could be incorporated in any known manner. As shown in this figure, movement of the bellows 232 in response to velocity changes at the Pitot head 230 will cause movement of the potentiometer wiper 234 to change the resistance of a potentiometer 236. The switch 192 may be rotated into engagement with a contact 238 so that he change in potential or resistance by reason of motion of the wiper 234 will cause a change in energization of the relay coil 174 against the energization of relay coil 172 which again will serve as a reference in a manner similar to that described above in connection with augmentation in control by the power boost action for the manual controls. It is to be understood that it would be possible to place the manual control and the speed compensator in series if desired, by means of a second switch, not shown, to obtain both the manual power boost function and the speed compensation function simultaneously.

Figure 10:
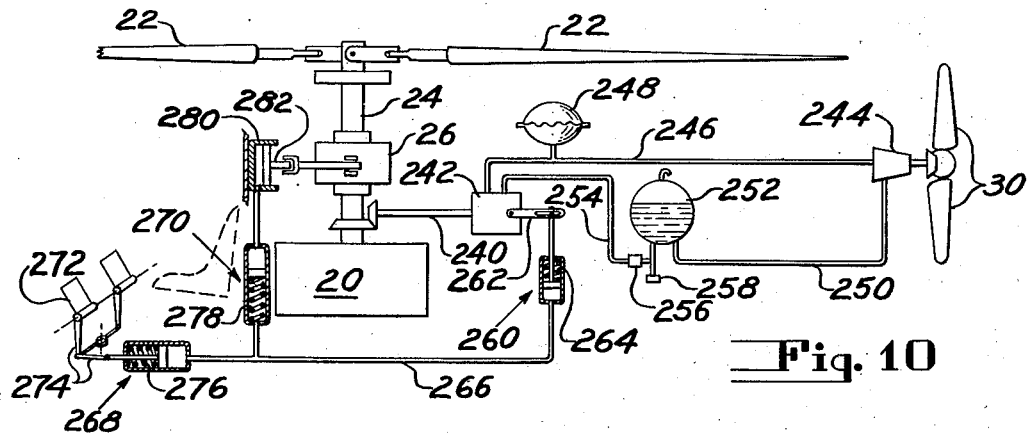
Fig. 10 is a diagrammatic view of a hydraulic modification of the invention.

Referring now to the hydraulic modification shown in Fig. 10, the engine 20 turns the sustaining rotor blades 22 by means of a shaft 24 driven from the engine 20 through the gear box 26. The tail rotor blades 30 are driven hydraulically from the engine 20 which drives a shaft 240 that rotates a pump 242 that in turn supplies liquid to a hydraulic motor 244 through a high pressure pipe 246. The high pressure pipe 246 contains an accumulator 248 to reduce surging. Low pressure fluid from the motor 244 flows into a return pipe 250 connected to a sump 252, which sump connects with a supply pipe 254 equipped with a strainer 256 and a dirt pocket 258 to the pump 242. The pump 242 may be of the variable capacity type, such as those pumps in which pistons are changed in displacement by shifting the barrel containing the cylinders and pistons, and may be changed in its displacement by a hydraulic stroke motor 260 which operates upon an arm 262 for changing the capacity of the pump 242. The stroke motor 260 may be biased downwardly by a spring 264 which may conveniently return the arm 262 to a position in which the pump 242 has the highest torque capacity with respect to the motor 244. The stroke motor 260 is connected hydraulically by a pipe 266 with a manually operated stroke motor 268 and to an automatically operated stroke motor 270.

The manually operated stroke motor 268 is connected with the foot pedals 272 by linkage 274 and may conveniently be spring biased as by a spring 276 so that the operator of the pedals 272 will not need to exert a large force through a distance to operate the stroke motor 268. Operation of the pedals 272 will move the stroke motor 268 to position the stroke motor 260 and thus the arm 262 to change the capacity of the pump 242 with respect to the motor 244 and change the speed of rotation of the blades 30 to change the thrust thereof and thus control the attitude of the helicopter.

The automatically operated stroke motor 270 is biased by a spring 278 in a direction to maintain the oil in pipe 266 at a low pressure and the pressure within a chamber 280 at a relatively high pressure. The chamber 280 is variable in volume by a piston 282 which is moved towards the left in response to an increase in torque of the main rotor blades 22. The spring 278 affords a resilient return and can be operative upon a piston within the stroke motor 270 of a size in proportion to the piston 282 to maintain the pressure in the pipe 266 at the desired value and the pressure in the chamber 280 at a predetermined higher value to counteract the main rotor torque. Motion of the piston 282 will cause the stroke motor 270 to actuate the stroke motor 268 to move the arm 262 of the pump 242 in a direction to speed up the rotation of the motor 244 and thus change the thrust exerted by the blades 30 which, in this modification, may be of fixed pitch, if desired, or may be made with a variable pitch for trimming purposes, if desired, in a manner to be described in connection with Fig. 12.

Figure 11:
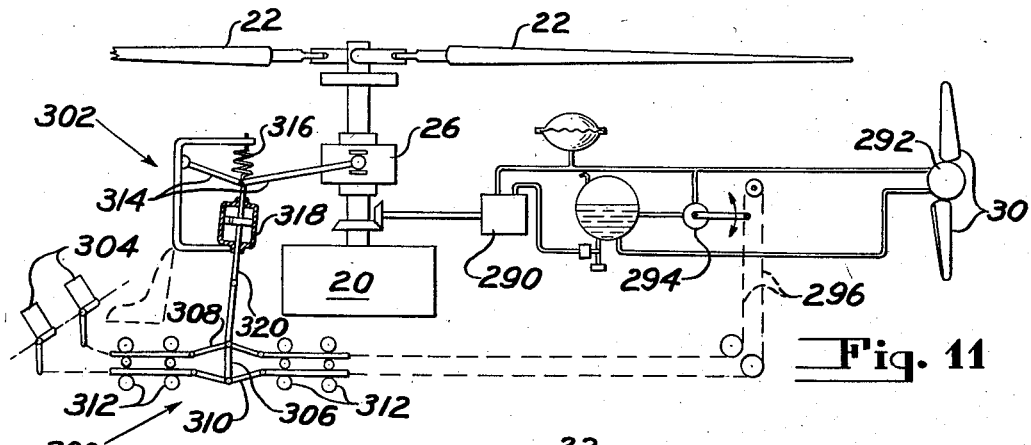
Fig. 11 is a diagrammatic view of a hydromechanical modification.

Referring now to Fig. 11, a mechanical hydraulic system is shown, and the drive from the engine 20 to the blades 22 may be substantially the same as set forth in connection with the figures described above. In this modification, however, a substantially constant speed and capacity pump 290 is connected with a constant displacement motor 292. This type of pump and motor combination is usually simpler to manufacture and hence more economical to install.

To provide for variation in the thrust of the blades 30, I provide a by-pass valve 294 which is controlled by cables 296. As the valve 294 is moved in one direction or the other, more or less high pressure fluid is fed from the pump 290 to the motor 292 or to the sump. A modified mechanical structure is also provided at 300 for causing an automatic control mechanism 302 responsive to torque of the gear box 26 to lengthen and shorten one or the other of cables 296 depending upon the counter-torque force exerted by the gear box 26, which structure 302 in combination with the cables 296 and the mechanical adjustment mechanism 300 work with the manual pedals 304 as a reference. For manual control purposes, the pedals 304 may be depressed differentially and as the lower cable 296 moves in one direction, the upper cable 296 can move in the opposite direction, and a link 306 connecting the mid-points of toggles 308 and 310 will rotate. Spring connections may be provided in the cables 296 as required, to take up any slack which might exist upon excess movement of the cables 296. The toggle device 300 is guided in suitable rolls 312.

The automatic torque responsive mechanism 302 comprises toggle arms 314 spring biased upward as by a spring 316 which acts upon a dash pot 318 that will dampen any vibrations occurring in the gear box 26. As the torque from the gear box 26 increases, the toggle arms 314 are rotated so that their common connection point is urged downwardly, which pushes a shaft 320 downwardly to straighten out the upper toggle 308 more and move the upper cable 296 towards the right, and bend the lower toggle 310 more to move the lower cable 296 towards the left. This will raise the arm of the valve 294 so that less fluid will feed from the high pressure line from the pump 290 back to the sump and more high pressure fluid will be fed to the motor 292 whereby the power input to and hence the thrust of the blades 30 will be increased. Upon a decrease in torque in the gear box 26, the opposite action will obtain, and the thrust of the blades 30 will be decreased.

Figure 12:
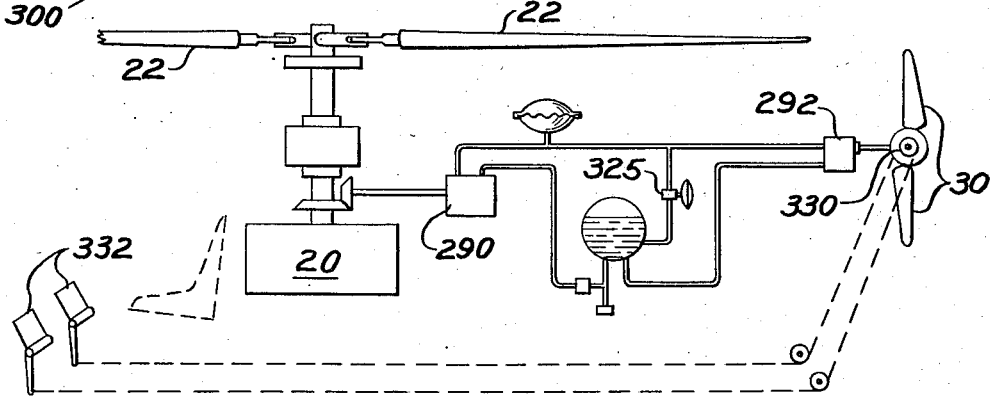
Fig. 12 is a diagrammatic view of a hydraulic drive without the automatic torque compensation feature.

Referring now to Fig. 12, the motor 20 drives the rotor blades 22 in substantially the same manner described above in connection with the other modifications. The pump and motor combination described in Fig. 11 may be used in substantially the same form in that modification shown in Fig. 12. However, in Fig. 12, an automatic by-pass valve 325, responsive to pressure in the high pressure line from the pump to the motor 292 may prevent overloading of the hydraulic system at excessive pitch settings of the rotor blades 30, in case such condition obtains. For the purpose of varying the thrust in this modification, I employ a worm pitch adjustment 330 which may be of the kind disclosed in Patent No. 2,318,259, entitled, "Direct Lift Aircraft," filed April 6, 1940. To control the pitch of the blades 30, pedals 332 may be operated by the pilot. This type of control is applicable in that form of the invention disclosed in Fig. 10 for varying the pitch of the blades 30 manually in combination with the structure shown therein and may incorporate a hydraulic power boost, if desired, such as in that modification of the invention shown in Fig. 11.

Several of the features of the different modifications shown and described above can be employed with other parts of the systems if desired. For this reason, I wish not to be limited only to those forms shown and described, but by combination and subcombination thereof, as set forth in the following claims.

I claim:

1. In a rotary wing aircraft, a main sustaining rotor, an auxiliary anti-torque rotor, an engine, fixed ratio drive means for driving each of said rotors at predetermined relative speeds, said auxiliary rotor having means for varying its thrust to compensate for variations in the torque of said main rotor, means for measuring main rotor torque including a movable member, spring means for normally balancing the torque exerted by said main rotor on said movable member, means operatively connecting said member with said thrust varying means including rigid linkage elements, and pilot operated means having an operative connection with said linkage elements for adjusting said thrust varying means of said auxiliary rotor independently of the position of said movable member.

2. In a rotary wing aircraft, a main sustaining rotor, an auxiliary anti-torque rotor, an engine, fixed ratio drive means for driving each of said rotors at predetermined relative speeds, said auxiliary rotor having means for varying its thrust to compensate for variations in the torque of said main rotor, means for measuring main rotor torque including a movable member, spring means for normally balancing the torque exerted by said main rotor on said movable member, linkage means operatively connecting said member with said thrust varying means, and pilot operated means for adjusting said thrust varying means independently of said torque measuring means having an operative connection to said linkage means between said movable member and said thrust varying means.

3. In a rotary wing aircraft, a main sustaining rotor, an auxiliary anti-torque rotor, an engine, fixed ratio drive means for driving each of said rotors at predetermined relative speeds, said auxiliary rotor having means for varying its thrust to compensate for variations in the torque of said main rotor, means for measuring main rotor torque including a movable member, spring means for normally balancing the torque exerted by said main rotor on said movable member, linkage means operatively connecting said member with said thrust varying means, and pilot operated means for adjusting said thrust varying means relative to said balanced movable member including an operating member having an operative connection with said linkage means between said thrust varying means and said movable member and movable relative to said movable member in any balanced position of the latter.

4. In a rotary wing aircraft, a main sustaining rotor, an auxiliary anti-torque rotor, an engine for driving said rotors, said auxiliary rotor having means for varying its thrust to compensate for variations of torque of said main rotor, means for measuring main rotor torque including a movable member, spring means for normally balancing the torque exerted by said main rotor on said member, actuating means operatively connecting said member and said thrust varying means and responsive to changes in position of said member for adjusting the thrust varying means of said auxiliary rotor including a toggle having two pivotally connected links movable between an aligned position and an angularly related position, and pilot operated means having an operative connection to the common pivot of said links.

HARRY THOMAS JENSEN.

References Cited in the file of this patent

UNITED STATES PATENTS

| Number | Name | Date |
|---|---|---|
| 1,783,011 | Florine | Nov. 25, 1930 |
| 2,317,342 | Pullin | Apr. 27, 1943 |
| 2,327,370 | Pullin | Aug. 24, 1943 |
| 2,337,571 | Pullin | Dec. 28, 1943 |
| 2,382,707 | Gosslau et al. | Aug. 14, 1945 |
| 2,383,139 | McGuire | Aug. 21, 1945 |
| 2,427,982 | Trotter | Sept. 23, 1947 |
| 2,491,191 | Maillard et al. | Dec. 13, 1949 |
| 2,496,624 | Heintze | Feb. 7, 1950 |
| 2,503,172 | Pullin | Apr. 4, 1950 |